March 29, 1949.  D. P. TRILLER  2,465,945
ADJUSTABLE OPTICAL UNIT FOR SOUND
MOTION-PICTURE APPARATUS
Filed March 22, 1946
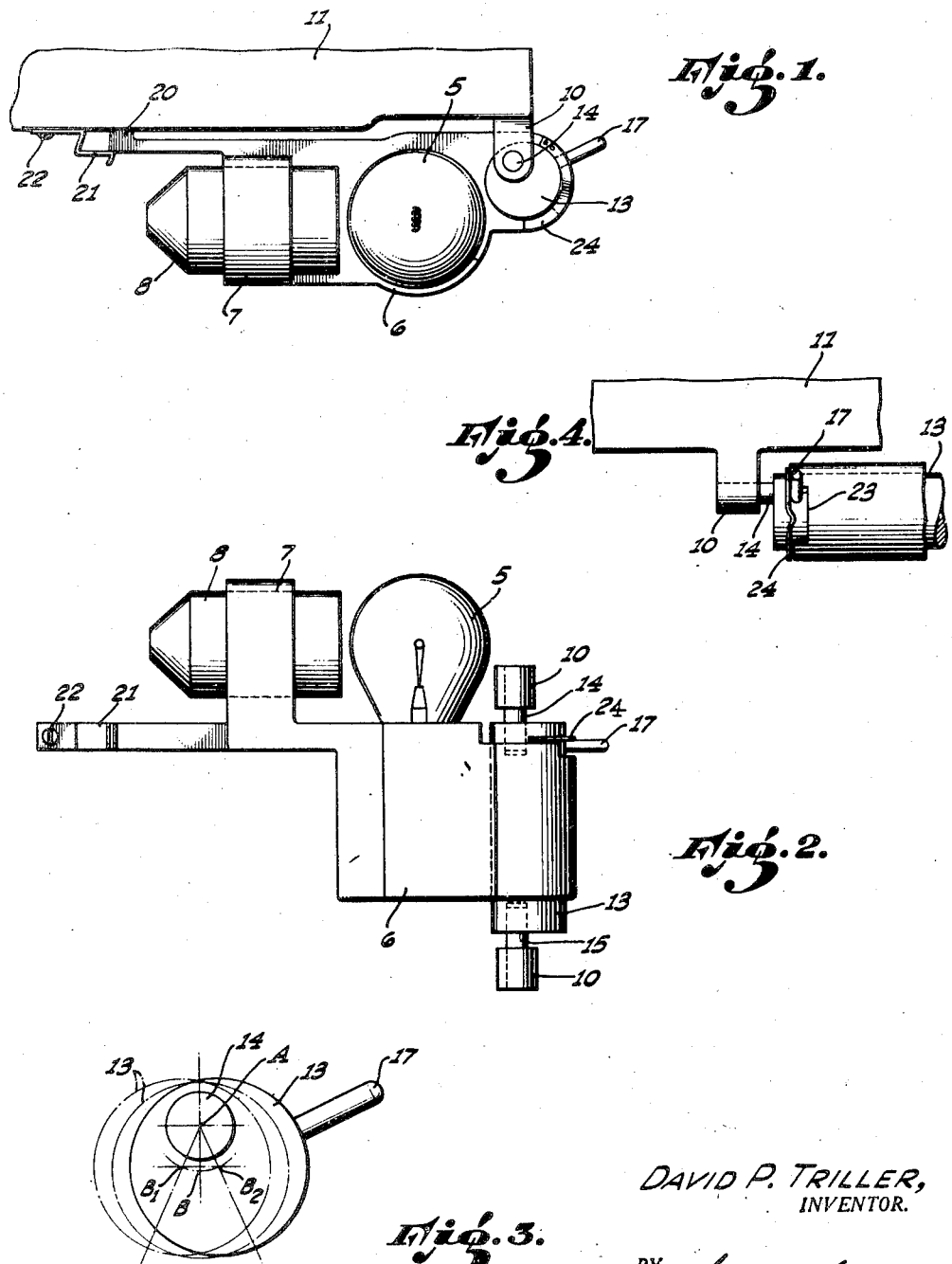
DAVID P. TRILLER,
INVENTOR.
BY [signature]
ATTORNEY.

Patented Mar. 29, 1949

2,465,945

UNITED STATES PATENT OFFICE 2,465,945

ADJUSTABLE OPTICAL UNIT FOR SOUND MOTION-PICTURE APPARATUS

David P. Triller, Indianapolis, Ind., assignor to Radio Corporation of America, a corporation of Delaware Application March 22, 1946, Serial No. 656,215

6 Claims. (Cl. 88—24)

This invention relates to motion picture apparatus, and particularly to the optical units of sound motion picture projection equipment, although it is also adaptable to the optical units for sound recording systems.

In the projection of motion pictures and in the reproduction of the concomitant sound, it is well-known that to obtain optimum reproduction, it is necessary that the narrow scanning light beam be sharply focused on the sound track. In commercial 35 mm. equipment, the light source for projecting the picture and the light source for scanning the sound track are positioned on the same side of the film. That is, the film passes between the light sources and the screen and photocell so that the light beams strike on the emulsion side of the film.

However, in the standard type of 16 mm. projectors, the picture projecting light source is positioned on one side of the film and the scanning light source for the sound track is positioned on the opposite side of the film as it passes from the supply reel to the take-up reel. If, therefore, only one form of sound film were projected, the optics of each light source could be permanently focused on the emulsion of the film regardless of whether it was on the side toward the light source or on the opposite side of the film base. However, in the production of 16 mm. film, different types of prints are made; that is, it frequently happens that to project some prints properly, the emulsion side of the film is toward the light source, while in other prints, the emulsion side of the film is away from the light source. Thus, if the optics of the scanning light beam were focused on the emulsion when facing the light source, it would be out of focus for another film on which the emulsion were on the opposite side of the film base. This variation, as far as picture projection is concerned, is not particularly serious; but, in view of the small dimensions of the high frequency modulations on the sound track and the narrow light beam, this change in the position of the sound track, although only to the extent of the thickness of the film, nevertheless does introduce a noticeable distortion or lack of clearness in the reproduction.

The present invention, therefore, is directed to a means of quickly changing the focus of the optical system for the scanning light beam from one side to the other side of the film. This is accomplished in a single operation between predetermined positions along the optical axis of the optical system.

The principal object of the invention, therefore, is to facilitate the reproduction of sound from film regardless of what side of the film the sound track is on.

Another object of the invention is to provide an improved optical adjustment for shifting the focus of the scanning beam from one side to the other of a motion picture film.

A further object of the invention is to provide an improved focusing adjustment for a scanning light beam which is accurate and rapid in operation between predetermined fixed positions.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a plan view of an optical adjusting device embodying the invention.

Fig. 2 is an elevational view of the device as shown in Fig. 1.

Fig. 3 is a diagrammatic view illustrating the shifting operation for the optical system; and Fig. 4 is a detailed view showing the arrangement for locking the device in two predetermined positions.

Referring now to the figures, in which the same numerals identify like elements, an exciter lamp 5 is shown mounted in a bracket 6 on an arm 7 of which is positioned the optical barrel 8 containing the usual slit mask and projection lens. The bracket 6 is mounted on horizontally extending ears 10 on the frame 11. Mounting pins 14 and 15 extend through holes in the ears 10 and into recesses in a shaft 13 in the bracket 6. The shaft 13 is eccentrically mounted on the pins 14 and 15, and is rotatable thereon and within the bracket by a lever 17.

To guide the bracket 6 during adjustment, and thus, the exciter lamp 5 and optical barrel 8, the bracket has an extension 20 held in position by a leaf spring 21 mounted on the frame 11 in any suitable manner, such as by a screw 22. Thus, the bracket 6 may be adjusted horizontally behind the leaf spring, while the end of the extension 20 is quickly removable from behind the spring to permit the bracket to be rotated on the pins 14 and 15 for easy access to the lamp 5 and barrel 8, as shown in Fig. 1. Horizontal adjustment is accomplished by turning the eccentric shaft 13 by the handle 17.

Referring now to Fig. 3, it will be noted that the axis of pins 14 and 15 provide a fixed center A, on which the eccentric shaft 13 rotates, such as between points $B_1$ and $B_2$ through point B. As shown in Fig. 4, the handle 17 moves back and forth in a notch 23 which defines its extreme limits of movement to correspond to points $B_1$ and $B_2$ in Fig. 3. A leaf spring 24 maintains the handle 17 in each extreme position when so adjusted. It will be noted that in passing from the position $B_1$ to position $B_2$, the optical axis is slightly tilted as the shaft rotates through position B. However, points $B_1$ and $B_2$ lie on a line parallel with the optical axis, and since the optical unit functions in these two positions only, the optical axis is not shifted and remains the same in both operating positions. The amount of adjustment or shifting of the focal plane corresponds to the thickness of the film.

Thus, the above mechanism provides a rapid and accurate adjustment of the image plane of the slit in the optical barrel 8 on the film regardless of whether or not the sound track is on the near or on the far side of the film with respect to the light source, and the reproducing efficiency of the sound portion of the projector will, therefore, be at its optimum as far as the optical system is concerned.

I claim:

1. In a light focusing device, the combination of a light source, an optical unit for focusing an image on a film, a bracket for supporting the light source and optical system in a fixed relationship to each other and to said bracket, means for eccentrically mounting one end of said bracket, means for rotating said eccentric mounting means for adjusting said bracket along the optical axis of said optical unit, and means for mounting the other end of said bracket for only longitudinal movement parallel with the optical axis of said optical system.

2. A focusing device for an optical system comprising a bracket, an exciter lamp and an optical unit fixedly mounted on said bracket, means for mounting one end of said bracket for rotational displacement, means for mounting the other end of said bracket for longitudinal displacement, and means for predetermining the limits of rotation of said first mentioned means for longitudinally adjusting said optical unit and said exciter lamp to two predetermined extreme positions along the optical axis of said optical unit.

3. A focusing device for an optical system in accordance with claim 2, in which said first mentioned means comprises supports having a fixed axis, an eccentric sleeve adapted to rotate on said fixed axis and in said bracket, and means for limiting the adjustment of said eccentric sleeve around said fixed axis.

4. A device for adjusting the focus of a light projection optical system to two planes comprising a bracket, means for mounting said bracket on a fixed vertical axis at one end thereof, an exciter lamp and an optical unit mounted on said bracket, the other end of said bracket being adjustable longitudinally parallel with the optical axis of said optical unit, a sleeve mounted within said bracket and rotatable on said fixed vertical axis, said sleeve being eccentrically mounted on said fixed axis, and means for rotating said sleeve on said fixed axis to two extreme positions, said rotation adjusting said optical unit along its optical axis.

5. An optical unit comprising a lens and slit barrel, a light source, a supporting frame, a bracket for fixedly mounting said barrel and light source to said frame in a fixed relationship with respect to each other, said bracket having a circular opening at one end thereof, a pair of fixed pins, a shaft adapted to rotate within said opening, said shaft being eccentrically mounted on said pins, and means for mounting the other end of said bracket for only longitudinal displacement parallel with the optical axis of said lens and slit barrel.

6. An optical unit in accordance with claim 5, in which said last mentioned means for mounting the other end of said bracket for longitudinal displacement includes an extension from said bracket parallel with the optical axis of said lens and slit barrel and a spring attached to said frame and bearing against said extension.

DAVID P. TRILLER.

REFERENCES CITED

The following references are of record in the file of this patent:

UNITED STATES PATENTS

| Number | Name | Date |
|---|---|---|
| 1,620,768 | Joy | Mar. 15, 1927 |
| 1,877,033 | Owens | Sept. 13, 1932 |
| 1,884,731 | Kindlemann | Oct. 25, 1932 |
| 1,936,204 | Owens | Nov. 21, 1933 |
| 2,002,352 | Owens | May 21, 1935 |
| 2,116,704 | Laube et al. | May 10, 1938 |
| 2,244,754 | Zimmerman | June 10, 1941 |
| 2,268,099 | Wein | Dec. 30, 1941 |